US009916575B2

(12) United States Patent
Salcedo et al.

(10) Patent No.: US 9,916,575 B2
(45) Date of Patent: Mar. 13, 2018

(54) SYSTEMS AND METHODS FOR ADAPTIVE ROUTING FOR MULTIPLE SECURE ELEMENTS

(71) Applicant: QUALCOMM Incorporated, San Diego, CA (US)

(72) Inventors: Alberto Jose Salcedo, Chula Vista, CA (US); Ashish Banthia, San Diego, CA (US); Jeremy O'Donoghue, Wokingham (GB)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 14/594,894

(22) Filed: Jan. 12, 2015

(65) Prior Publication Data

US 2016/0140537 A1    May 19, 2016

Related U.S. Application Data

(60) Provisional application No. 62/081,784, filed on Nov. 19, 2014.

(51) Int. Cl.
| | |
|---|---|
| *G06Q 20/32* | (2012.01) |
| *G06Q 20/40* | (2012.01) |
| *G06Q 30/04* | (2012.01) |
| *G06Q 20/36* | (2012.01) |
| *G06Q 20/22* | (2012.01) |
| *G06Q 20/30* | (2012.01) |

(52) U.S. Cl.
CPC ......... *G06Q 20/3278* (2013.01); *G06Q 20/22* (2013.01); *G06Q 20/227* (2013.01); *G06Q 20/30* (2013.01); *G06Q 20/32* (2013.01); *G06Q 20/322* (2013.01); *G06Q 20/327* (2013.01); *G06Q 20/3227* (2013.01); *G06Q 20/3229* (2013.01); *G06Q 20/363* (2013.01); *G06Q 20/405* (2013.01); *G06Q 30/04* (2013.01)

(58) Field of Classification Search
CPC .................. G06Q 20/405; G06Q 20/3278
USPC ........................................ 235/379
See application file for complete search history.

(56) References Cited

U.S. PATENT DOCUMENTS

| | | | |
|---|---|---|---|
| 8,712,407 B1 | 4/2014 | Cope et al. | |
| 2009/0037326 A1* | 2/2009 | Chitti | G06Q 20/10 |
| | | | 705/39 |
| 2010/0082445 A1 | 4/2010 | Hodge et al. | |
| 2010/0280940 A1 | 11/2010 | Roberts | |

(Continued)

FOREIGN PATENT DOCUMENTS

| | | |
|---|---|---|
| WO | 2013015746 A2 | 1/2013 |
| WO | WO-2013049329 A1 | 4/2013 |

OTHER PUBLICATIONS

International Search Report and Written Opinion—PCT/US2015/056193—ISA/EPO—dated Feb. 2, 2016.

*Primary Examiner* — Toan Ly
(74) *Attorney, Agent, or Firm* — Austin Rapp

(57) ABSTRACT

A method for wireless communication is described. The method includes using a routing table for multiple secure elements. The routing table assigns a preferred secure element for a transaction type. The method also includes selecting a first secure element for a transaction based on the routing table. The method further includes updating the routing table based on a received command to use a second secure element to complete the transaction.

26 Claims, 8 Drawing Sheets

(56) References Cited

U.S. PATENT DOCUMENTS

| | | |
|---|---|---|
| 2011/0078082 A1* | 3/2011 | Gupta .................... G06Q 20/10 705/44 |
| 2011/0320293 A1 | 12/2011 | Khan |
| 2011/0320345 A1 | 12/2011 | Taveau et al. |
| 2012/0197691 A1 | 8/2012 | Grigg et al. |
| 2013/0204728 A1 | 8/2013 | Lichterman et al. |
| 2013/0331029 A1 | 12/2013 | Tang et al. |
| 2013/0339165 A1 | 12/2013 | Calman |
| 2014/0006259 A1 | 1/2014 | Grigg et al. |
| 2014/0012704 A1 | 1/2014 | Mizhen et al. |
| 2014/0046784 A1 | 2/2014 | Prakash et al. |

* cited by examiner

SYSTEMS AND METHODS FOR ADAPTIVE ROUTING FOR MULTIPLE SECURE ELEMENTS

RELATED APPLICATIONS

This application is related to and claims priority from U.S. Provisional Patent Application Ser. No. 62/081,784, filed Nov. 19, 2014, for "SYSTEMS AND METHODS FOR ADAPTIVE ROUTING FOR MULTIPLE SECURE ELEMENTS."

TECHNICAL FIELD

The present disclosure relates generally to electronic devices. More specifically, the present disclosure relates to systems and methods for adaptive routing for multiple secure elements in near-field communication (NFC).

BACKGROUND

The use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Aspects of the disclosure relate to devices with NFC technology. NFC technology can establish radio communication between different devices by touching them together or bringing them into close proximity. NFC allows two-way communication. For example, NFC peer-to-peer communication can occur when both devices are powered. Additionally, communication is also possible between an NFC device and an unpowered NFC chip. For example, NFC can involve an initiator and a target, where the initiator generates a radio frequency field that can power a passive target (e.g., tags, key fobs, cards).

NFC technology can facilitate information exchange in secure transactions, such as payment transactions. NFC-enabled electronic devices can be used in contactless payment systems, similar to those currently used in credit cards and electronic ticket smartcards. For example, an NFC-enabled electronic device allows users to store financial accounts in a virtual wallet and then use the NFC-enabled electronic device at terminals that accept such payment methods. NFC-enabled electronic devices can also be used as identification for access control, such as replacing traditional keys for either physical access (e.g., hotel room) or control (e.g., starting a car). NFC can facilitate other types of information (e.g., transferring media between mobile phones, ticketing for venue entrance).

However, the use of some wireless technology is currently limited. Some functions and abilities of an electronic device may depend on selecting between multiple secure elements to complete data transfers for transactions using wireless communication. As can be observed from this discussion, systems and methods for adaptive routing for multiple secure elements may be beneficial.

SUMMARY

A method for wireless communication is described. The method includes using a routing table for multiple secure elements. The routing table assigns a preferred secure element for a transaction type. The method also includes selecting a first secure element for a transaction based on the routing table. The method further includes updating the routing table based on a received command to use a second secure element to complete the transaction.

Selecting the first secure element for the transaction may include determining a transaction type of the transaction. The routing table may be used to determine that the first secure element is the preferred secure element for the transaction type.

Updating the routing table may include requesting confirmation from a user to use the first secure element for the transaction. The command to use the second secure element to complete the transaction instead of the first secure element may be received. The second secure element may be assigned as the preferred secure element for the transaction type in the routing table.

The method may also include dynamically selecting the second secure element for a subsequent transaction with a same transaction type based on the updated routing table.

The method may also include creating the routing table based on user preferences for transaction types provided at initiation of the multiple secure elements.

Transaction types of the routing table may be organized in one or more categories. The one or more categories may include at least one of a purchase category and an institution category.

The routing table may be sent to a near-field communication (NFC) controller. A payment system of the NFC controller may use the routing table to determine which secure element to select for a particular transaction.

An electronic device for wireless communication is also described. The electronic device includes a processor, memory in electronic communication with the processor, and instructions stored in the memory. The electronic device uses a routing table for multiple secure elements. The routing table assigns a preferred secure element for a transaction type. The electronic device also selects a first secure element for a transaction based on the routing table. The electronic device further updates the routing table based on a received command to use a second secure element to complete the transaction.

A computer-program product for wireless communication is also described. The computer-program product includes a non-transitory tangible computer-readable medium having instructions thereon. The instructions include code for causing an electronic device to use a routing table for multiple secure elements. The routing table assigns a preferred secure element for a transaction type. The instructions also include code for causing the electronic device to select a first secure element for a transaction based on the routing table. The instructions further include code for causing the electronic device to update the routing table based on a received command to use a second secure element to complete the transaction.

An apparatus for wireless communication is also described. The apparatus includes means for using a routing table for multiple secure elements. The routing table assigns a preferred secure element for a transaction type. The apparatus also includes means for selecting a first secure element for a transaction based on the routing table. The apparatus further includes means for updating the routing table based on a received command to use a second secure element to complete the transaction.

DETAILED DESCRIPTION

The systems and methods disclosed herein may be applied to electronic devices that communicate wirelessly and/or that communicate using a wired connection or link. For example, some electronic devices may communicate with other devices using an Ethernet protocol. In another example, some electronic devices may communicate with other devices using wireless communication. In one configuration, the systems and methods disclosed herein may be applied to an electronic device that communicates with another device using an induction-based communication technology. One implementation of an induction-based communication technology is near-field communication (NFC).

Various configurations are now described with reference to the Figures. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
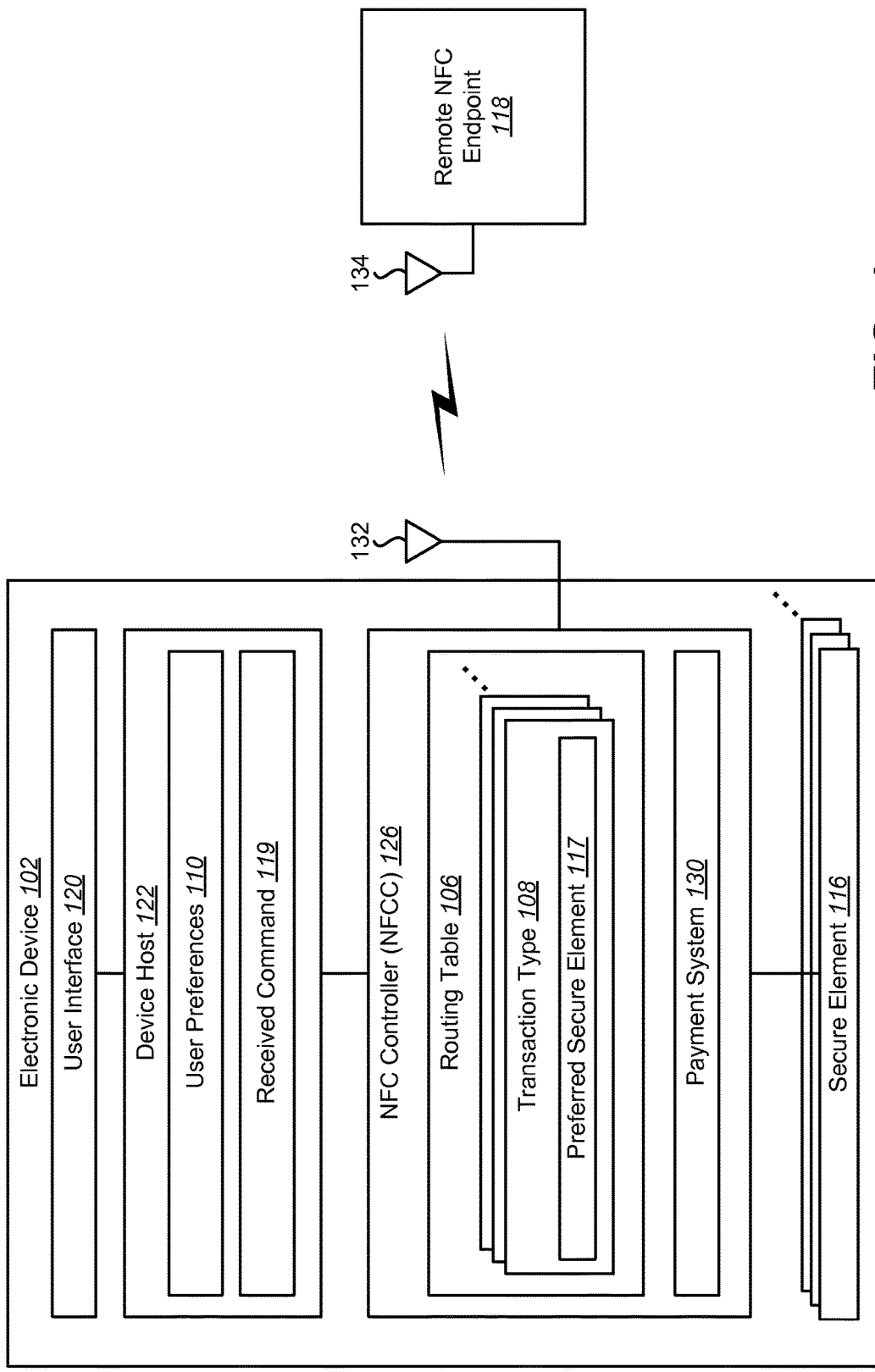
FIG. 1 is a block diagram illustrating one configuration of an electronic device in which systems and methods for adaptive routing one or more secure element may be implemented.

FIG. 1 is a block diagram illustrating one configuration of an electronic device 102 in which systems and methods for adaptive routing of one or more secure element 116 may be implemented. Examples of the electronic device 102 may include cellular phones, smartphones, tablet devices, voice recorders, digital cameras, still cameras, camcorders, gaming systems, laptop computers, etc.

The electronic device 102 may be configured to communicate with the remote near-field communication (NFC) endpoint 118 using NFC technology. Aspects of the present disclosure relate to the electronic device 102 conducting a transaction (e.g., payment transaction or financial transaction) with a remote NFC endpoint 118 using NFC protocols.

NFC is an inductively coupled communication technology. In the context of near-field communications, there are two devices communicating: an initiator and a target. The antenna of the initiator NFC device produces a radiated field (also referred to as a magnetic field or an electromagnetic field) that is received by the antenna of the target NFC device. The initiator NFC device has a transmitter and a receiver. The target NFC device also has a transmitter and a receiver. The initiator NFC device may also be referred to as a poller, polling device, reader or initiator. The target NFC device may also be referred to as a listener, listening device, tag or target.

An initiator NFC device and the target NFC device may use one or more NFC signaling technologies to communicate with each other. The NFC signaling technologies may include NFC type-A, NFC type-B and NFC type-F. The NFC signaling technologies differ in the modulation schemes employed.

NFC has four different tag types, which support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In one configuration, the initiator NFC device and the target NFC device may be operable to communicate using NFC through various interfaces, such as a frame radio frequency (RF) interface, ISO-data exchange protocol (DEP) RF interface and NFC-DEP RF interface. In another configuration, the initiator NFC device 102 and the target NFC device may establish an NFC-DEP RF protocol based communication link with link layer connections defined through a logical link control protocol (LLCP). In still another configuration, the initiator NFC device and the target NFC device may be operable to be connected to an access network and/or core network (e.g., a CDMA network, a GPRS network, a UMTS network, and other types of wireline and wireless communication networks).

In NFC, the initiator NFC device may generate the radiated field to communicate with the target NFC device. The target NFC device may receive the radiated field. The initiator NFC device may modulate the radiated field to send a signal (e.g., data) to the target NFC device. The initiator NFC device may receive the modulated signal and may try to decode it.

As used herein, the electronic device 102 may operate as a target NFC device (i.e., tag) and the remote NFC endpoint 118 may operate as an initiator NFC device (i.e., reader). The remote NFC endpoint 118 may poll for nearby NFC devices. The antenna 134 of the remote NFC endpoint 118 may generate a radiated field. The antenna 132 of the electronic device 102 may couple with this radiated field. The electronic device 102 may begin to listen when it comes within a few centimeters of the remote NFC endpoint 118. The remote NFC endpoint 118 will then communicate with the electronic device 102 in order to determine which signaling technologies can be used.

NFC is a popular communication technology for payment transactions. NFC provides a convenient and secure platform for conducting a payment transaction. An example of an NFC-enabled transaction can include a user who desires to pay a retailer for goods purchased using the electronic device 102. The electronic device 102 may transmit personal financial information (e.g., credit card account information) to a point of sale remote NFC endpoint 118 located at checkout. The user may bring the NFC-equipped electronic device 102 close to the remote NFC endpoint 118 to complete the purchase. The remote NFC endpoint 118 receives the user's credit card details via NFC and processes the payment with conventional methods and returns to the user an electronic receipt that can be stored in the electronic device 102.

In one configuration, the user's secure financial information may be stored in one or more secure element 116 on the electronic device 102. A secure element 116 may store sensitive information. For example, a secure element 116 may store credit card account numbers, transit accounts, and mobile phone details. A secure element may also be referred to as an electronic wallet.

A secure element 116 may be removable or embedded. Examples of a removable secure element 116 include a subscriber identity module (SIM) card or a universal integrated circuit card (UICC). An embedded secure element 116 may be integrated into the electronic device 102. For example, the secure element 116 may be a hardware partitioned secure section of a chip. To enable proximity payments, the secure element 116 may authenticate itself to a bank, and may be resistant to physical or logical attack.

The electronic device 102 may include an NFC controller (NFCC) 126. The NFCC 126 may perform NFC operations. The NFCC 126 may communicate via contact or non-contact NFC to the remote NFC endpoint 118. The NFCC 126 may be coupled to an antenna 132 that receives an NFC signal from the remote NFC endpoint 118. The NFCC 126 may be operable to obtain information from other devices, such as a remote NFC endpoint 118. For example, during ISO-DEP communication, the NFCC 126 may operate using a frame RF interface or an ISO-DEP interface. The NFCC 126 may interface with a secure element 116 to obtain sensitive data.

In some configurations, the NFCC 126 may act as a relay and communicate messages between a device host 122 and the remote NFC endpoint 118. A device host 122 may include a high-level application (e.g., operating system or payment processing application) to communicate with the NFCC 126. The device host 122 may extract data from messages exchanged with the remote NFC endpoint 118. Communications may prompt the NFCC 126 to change various data. The NFCC 126 may update received parameters and/or may store parameters in memory 154.

The device host 122 may be coupled to a user interface 120. The user interface 120 may enable a user to interact with the electronic device 102. Examples of a user interface 120 include a key or keyboard, a mouse, a touch-screen display, a microphone, etc.

Generally, a device host 122 may be operable in an environment that is not substantially limited by memory constraints while also potentially operating with comparatively higher power consumption. By contrast, the NFCC 126 may be operable in a memory limited environment while consuming comparatively less power.

A mobile credit card payment processing transaction is one example of a transaction involving the electronic device 102 utilizing an NFCC 126 in conjunction with a secure element 116. In this example, the NFCC 126 can be a middle party between the secure element environment, where the credit card information is stored, and a device host 122 which is used to facilitate the transaction. Therefore, the device host 122 used for payment processing by the electronic device 102 can transmit sensitive financial information to the remote NFC endpoint 118 by using the NFCC 126. Additionally, both the device host 122 and the NFCC 126 can communicate with the one or more secure element 116 to retrieve sensitive data in order to enable this payment processing transaction.

In some configurations, an NFC-enabled electronic device 102 may include multiple secure elements 116. A typical user with multiple major credit cards will use NFC technology in the electronic device 102 instead of actual credit cards. For example, with so many rewards programs offered today, it is typical for users to use a specific credit card for a specific purpose. For example, using a specific credit card for gas, another credit card for dining, another credit card for shopping and so on. Given this, there is a need for an easy way for the user to achieve his or her goal of using a specific credit card depending on the transaction type without manually choosing the credit card every single time.

As described above, credit card or access ticket information may be stored on an electronic device 102 in a secure element 116. An electronic device 102 capable of performing NFC communications may be used to complete transactions instead of using the physical credit cards or access tickets.

The systems and methods described herein enable an electronic device to learn a user's purchasing tendencies and adaptively create a routing table 106 based on the user's purchasing tendencies. For example, a user may use a secure element 116 each time to purchase gasoline. The electronic device 102 may record this tendency and update the routing table 106 to select the same secure element 116 for future gasoline purchases.

The ability to learn the user's purchasing tendencies and assign a preferred secure element 117 may reduce the time necessary to complete a transaction that utilizes NFC communication. For example, the time needed to select a secure element 116 on the electronic device 102 may be reduced if the user does not have to manually select the secure element 116 every transaction.

The electronic device 102 may use a routing table 106 for multiple secure elements 116. The routing table 106 may assign a preferred secure element 117 for a transaction type 108. The routing table 106 may associate a secure element 116 with a particular transaction type 108. This secure element 116 may be the preferred secure element 117 for that transaction type 108.

In one configuration, the routing table 106 may be a lookup table that maps transaction types 108 with one or more secure elements 116. In one implementation, the transaction type 108 may be the input for the routing table 106 and the preferred secure element 117 as the output. Alternatively, the routing table 106 may be a database that contains associations of transaction types 108 with their preferred secure element 117.

The NFCC 126 may include one or more payment system 130. In one configuration, the payment system 130 may be a proximity payment system environment (PPSE). The payment system 130 may be a program, software or instructions that may be run by the NFCC 126 in order to perform one or more functions (e.g., to perform credit card transactions, etc.). The payment system 130 may use the routing table 106 to determine which secure element 116 to use for a particular transaction.

The routing table 106 may be created by the device host 122. The routing table 106 may be created based on user preferences 110 for transaction types 108. There may be one or more transaction type 108 defined in the routing table 106. The transaction types 108 may be different categories of transactions. In one configuration, the transaction types 108 may be groups of different transactions that have common characteristics. For example, the transaction types 108 may include a purchase category, an institution category and a balance category. Each transaction type 108 may be organized into further sub-categories.

The user preferences 110 may be an association of the transaction type 108 with a preferred secure element 117. In one configuration, the user preferences 110 may be a history of secure element 116 usage by a user over a period of time. For example, the user may consistently use a particular secure element 116 connected to a MasterCard each time the user purchases groceries. The user preferences 110 may indicate that for a grocery transaction type 108, the MasterCard secure element 116 is the preferred secure element 117.

In another configuration, the user preferences 110 may be a list of one or more secure elements 116 to be used for different transaction types 108 created by the user. The user may indicate a preferred secure element 117 at initiation of the multiple secure elements 116. For example, the electronic device 102 may be a new cell phone. The user may perform an initial configuration of the multiple secure elements 116 in which the user programs the electronic device 102 with which secure element 116 to use for different transaction types 108. The user may also manually edit the secure element/transaction type association at any time.

The device host 122 may create the routing table 106 based on the user preferences 110 for the transaction types 108. The device host 122 may use the user preferences 110 to map transaction types 108 with the associated preferred secure element 117 to create the routing table 106. The routing table 106 may group the multiple secure elements 116 into different categories to reduce the time necessary to complete a transaction. Upon creating the routing table 106, the device host 122 may send the routing table 106 to the NFCC 126.

The NFCC 126 may initiate a transaction with the remote NFC endpoint 118. The transaction may be a payment or financial transaction. For example, the transaction may be to purchase groceries, gas, transportation, etc.

The NFCC 126 may determine the transaction type 108 of the current transaction. The NFCC 126 may determine the transaction type 108 of the current transaction using various methods. For example, the device host 122 or NFCC 126 may determine a transaction type 108 based on a global positioning system (GPS) location, location services of the electronic device 102, Facebook (FB) check-ins or Foursquare check-ins, etc.

The NFCC 126 may select a first secure element 116 for the transaction based on the routing table 106. Using the determined transaction type 108 of the current transaction, the NFCC 126 may access the routing table 106 to determine that a first secure element 116 is the preferred secure element 117 for the transaction. In one example, upon creating the routing table 106, the user preferences 110 may have indicated that the first secure element 116 was the preferred secure element 117 for the transaction type 108 of the current transaction. Upon initiating the transaction, the NFCC 126 may look up the transaction type 108 in the routing table 106 to select the first secure element 116 as the preferred secure element 117.

Upon selecting the first secure element 116 for the transaction, the electronic device 102 may request confirmation from a user to use the first secure element 116 for the transaction. For example, the device host 122 may display a message on the user interface 120 asking the user to confirm that the transaction should proceed with the first secure element 116. If the user confirms this selection, the transaction may proceed with the first secure element 116. Alternatively, if the electronic device 102 is in a low power mode and the device host 122 is unavailable, the NFCC 126 may complete the transaction using the first secure element 116 according to the routing table 106. The electronic device 102 may provide a record of this transaction to the user at a later time when the device host 122 is available.

If the user chooses to use a second secure element 116 to complete the transaction instead of the first secure element 116, then the electronic device 102 may update the routing table 106 to reflect this decision. The device host 122 may receive a command 119 to use the second secure element 116 to complete the transaction instead of the first secure element 116. For example, the received command 119 may be the user response to the confirmation message. The device host 122 may update the routing table 106 by assigning the second secure element 116 as the preferred secure element 117 for the current transaction type 108 in the routing table 106. The device host 122 may send the updated routing table 106 to the NFCC 126 for future transactions.

In other words, if the user does not confirm the secure element 116 selected by the electronic device 102, but instead chooses another secure element 116 to complete the transaction, the electronic device 102 may use the second secure element 116 to complete the transaction with the remote NFC device 118. The electronic device 102 may then adapt the routing table 106 to indicate that the second selected secure element 116 is the preferred secure element 117 for future transactions with the same transaction type 108. When the user initiates a subsequent transaction with the same transaction type 108, the NFCC 126 will dynamically (e.g., automatically) select the second secure element 116 for the subsequent transaction.

In another configuration, the electronic device 102 may complete a transaction using the first secure element 116 indicated by the routing table 106 without receiving confirmation from the user. In this configuration, the NFCC 126 may complete the transaction automatically based on the routing table 106. The electronic device 102 may provide the user with notification that of the first secure element 116 selection after completing the transaction. In response to this notification, the user may decide to use the second secure element 116 as the preferred secure element 117. The user may manually modify the routing table 106 to use the second secure element 116 as the preferred secure element 117.

In yet another configuration, the user may have the ability to form exceptions within the transaction types 108 of the routing table 106. The user may assign a separate secure element 116 for these exceptions. Based on a particular transaction, the user may form an exception for the preferred secure element 117 for that transaction without changing the preferred secure element 117 for that transaction type 108. This exception may be configured via the user interface 120, for instance.

The benefits of the adaptive routing described herein include using the routing table 106 to reduce the processing power and time needed to complete a transaction. The electronic device 102 may update the routing table 106 to reduce the time needed to complete future transactions. Furthermore, the electronic device 102 may adaptively select the correct secure element 116 based on a user's purchasing tendencies, thus providing an improved user experience.

Figure 2:
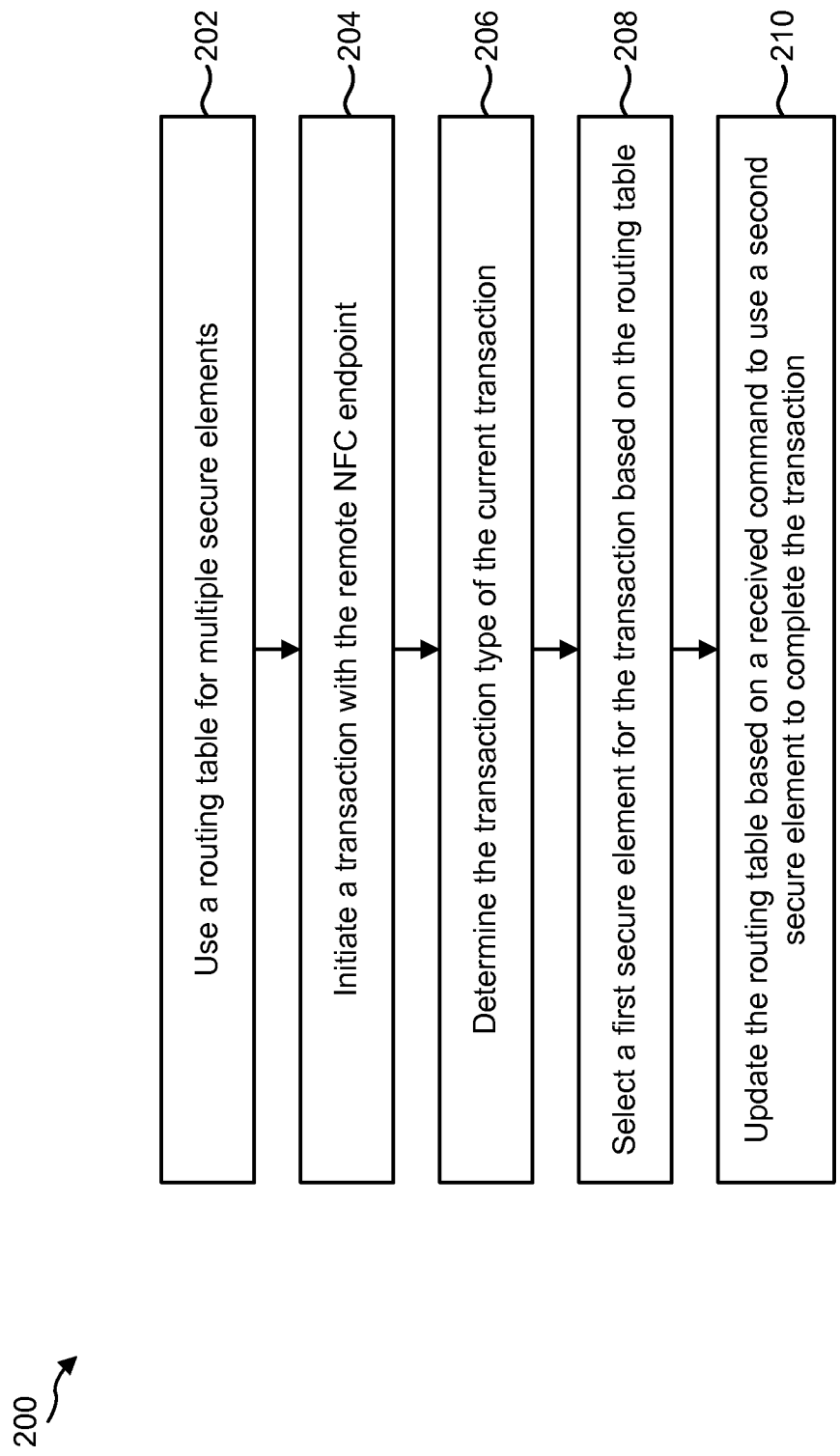
FIG. 2 is a flow diagram illustrating one configuration of a method for adaptive routing for one or more secure element by an electronic device.

FIG. 2 is a flow diagram illustrating one configuration of a method 200 for adaptive routing for one or more secure element 116 by an electronic device 102. The electronic device 102 may use 202 a routing table 106 for multiple secure elements 106. The routing table 106 may assign a preferred secure element 117 for a transaction type 108.

In one configuration, the routing table 106 may be a lookup table that maps transaction types 108 with one or more secure element 116. The routing table 106 may associate a secure element 116 with a particular transaction type 108. This secure element 116 may be the preferred secure element 117 for that transaction type 108. In one implementation, the transaction type 108 may be the input for the routing table 106 and the preferred secure element 117 as the output.

The electronic device 102 may initiate 204 a transaction with a remote NFC endpoint 118. For example, the transaction may be to purchase groceries, gas, transportation, etc.

The electronic device 102 may determine 206 the transaction type 108 of the current transaction. The electronic device 102 may determine the transaction type 108 of the current transaction using various methods. For example, the electronic device 102 may determine a transaction type 108 based on a global positioning system (GPS) location, location services of the electronic device 102, Facebook (FB) check-ins or Foursquare check-ins, etc.

The electronic device 102 may select 208 a first secure element 116 for the transaction based on the routing table 106. Using the determined transaction type 108 of the current transaction, the electronic device 102 may access the routing table 106 to determine that a first secure element 116 is the preferred secure element 117 for the transaction. For example, upon creating the routing table 106, the user preferences 110 may have indicated that the first secure element 116 was the preferred secure element 117 for the transaction type 108 of the current transaction. Upon initiating the transaction, the electronic device 102 may look up the transaction type 108 in the routing table 106 to select the first secure element 116 as the preferred secure element 117.

The electronic device 102 may update 210 the routing table 106 based on a received command 119 to use a second secure element 116 to complete the transaction. For example, upon selecting the first secure element 116 for the transaction, the electronic device 102 may request confirmation from a user to use the first secure element 116 for the transaction. If the user chooses to use a second secure element 116 to complete the transaction, then the user may enter the command 119 indicating this decision.

Upon receiving the command 119 receiving the command 119 to use the second secure element 116 to complete the transaction instead of the first secure element 116, the electronic device 102 may update 210 the routing table 106 by assigning the second secure element 116 as the preferred secure element 117 for the current transaction type 108 in the routing table 106. When the electronic device 102 initiates a subsequent transaction with the same transaction type 108, the electronic device 102 will dynamically (e.g., automatically) select the second secure element 116 for the subsequent transaction.

Figure 3:
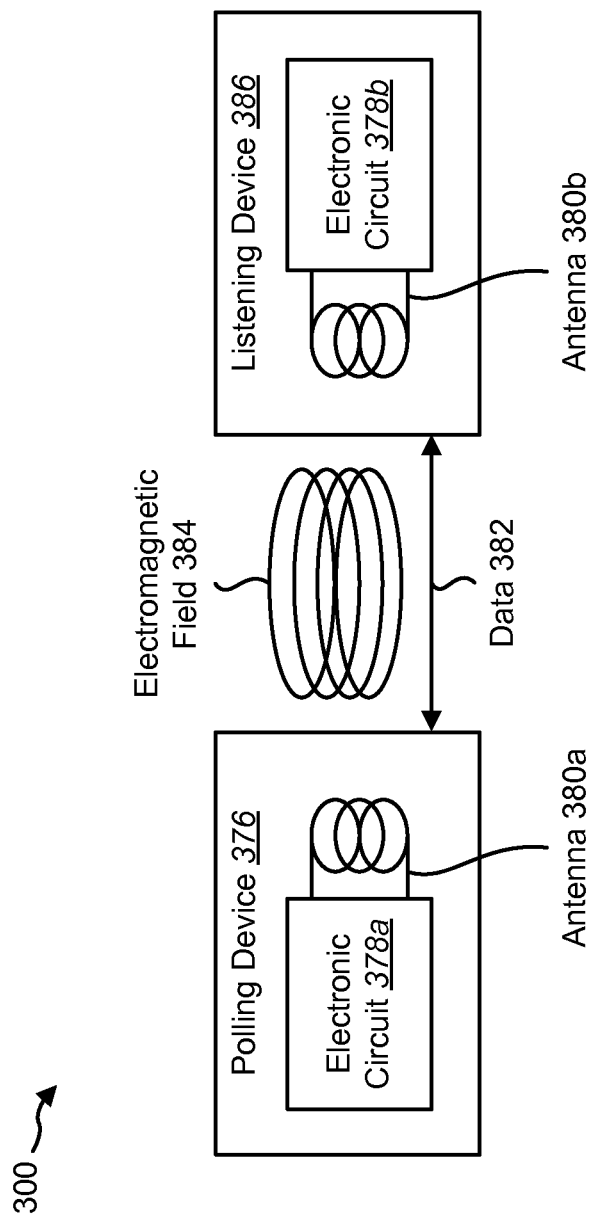
FIG. 3 is a block diagram illustrating one configuration of near-field communication (NFC) in a wireless communication system.

FIG. 3 is a block diagram illustrating one configuration of near-field communication (NFC) in a wireless communication system 300. A polling device 376 and a listening device 386 may operate according to NFC protocols. The polling device 376 and the listening device 386 may be implemented according to electronic device 102 described in connection with FIG. 1. In other words, the electronic device 102 described in connection with FIG. 1 may operate as either a polling device 376 a listening device 386 or both.

Each device 376, 386 may include an antenna 380a-b connected to an electronic circuit 378a-b. During operation, the combination of two NFC devices (i.e., the polling device 376 and listening device 386) may behave like a transformer.

NFC is an inductive coupling communication technology. The two NFC-capable devices 376, 386 may be separated by a distance. An alternating current may pass through a primary coil (i.e., the polling device antenna 380a) and create an electromagnetic field 384 (which may also be referred to as a radio frequency (RF) field or radiated field). The electromagnetic field 384 may induce a current in the secondary coil (i.e., the listening device antenna 380b). The listening device 386 may use the electromagnetic field 384 transmitted by the polling device 376 to power itself.

The configuration and tuning of both antennas 380a-b may determine the coupling efficiency from one device to the other device. During certain NFC transactions, the listening device 386 may function as a target, which is a role defined in the NFC standards.

In one configuration, the NFC transmitter of one device and the NFC receiver of the other device are configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the "near-field" of the radiated field.

An NFC device may include an NFC loop antenna 380. The NFC loop antenna 380 may provide a means for energy transmission and reception. As stated, an efficient energy transfer may occur by coupling a large portion of the energy in the near-field of a transmitting antenna 380 to a receiving antenna 380 rather than propagating most of the energy in an electromagnetic wave to the far field.

An NFC-capable device may obtain sufficient data 382 to allow for communications to be established. One form of communications that may be established is an international standards organization data exchange protocol (ISO-DEP) communication link. Communications between the NFC devices may be enabled over a variety of NFC radio frequency (RF) technologies, including but not limited to, NFC-A, NFC-B, etc.

Figure 4:
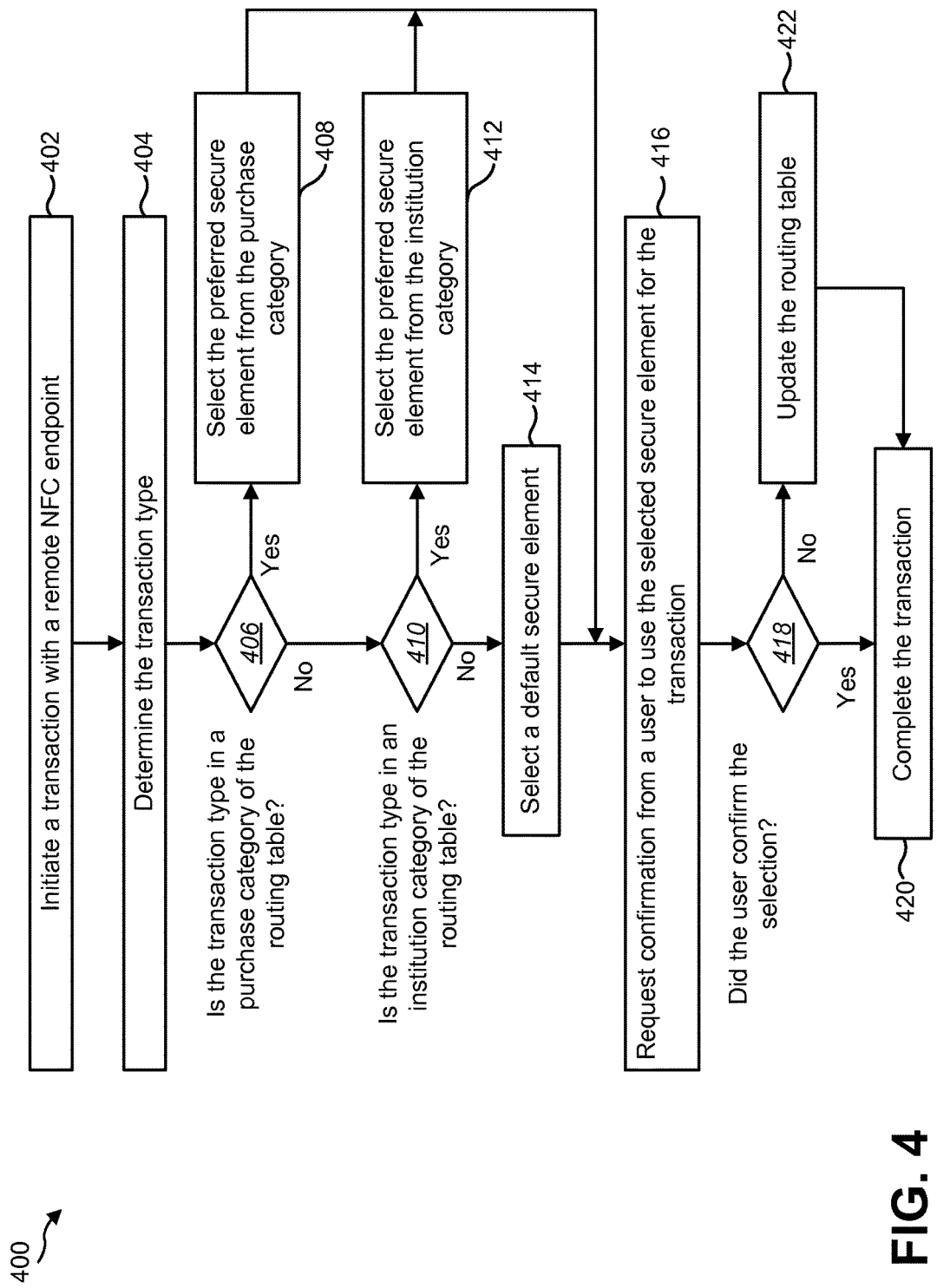
FIG. 4 is a flow diagram illustrating a method for adaptive routing for multiple secure elements by an electronic device.

FIG. 4 is a flow diagram illustrating one configuration of a method 400 for adaptive routing for multiple secure elements 116 by an electronic device 102. The electronic device 102 may include an NFCC 126 and multiple secure elements 116. In one implementation, the method 400 may be performed by the NFCC 126.

The electronic device 102 may initiate 402 a transaction with a remote NFC endpoint 118. The transaction may be to purchase goods or obtain access to a building or public transportation, etc. For example, the transaction may be for accessing a subway train, buying a meal from a restaurant or for purchasing groceries.

The electronic device 102 may determine 404 the transaction type 108 of the transaction. For example, if the transaction is to purchase groceries, the transaction type 108 may be may be identified as "grocery". This transaction type 108 may or may not be included in a category in a routing table 106. In one configuration, the categories may include purchases, institutions and account balances. The routing table 106 may associate transaction types 108 with a preferred secure element 117. The routing table 106 may be created based on user preferences 110 as described above in connection with FIG. 1.

The electronic device 102 may determine 406 whether the transaction type 108 is in a purchase category of the routing table 106. If the transaction type 108 is included in the purchase category of the routing table 106 of the routing table 106, then the electronic device 102 may select 408 the preferred secure element 117 that is associated with that transaction type 108, as indicated by the routing table 106.

If the electronic device 102 determines 406 that the transaction type 108 is not in the purchase category of the routing table 106, then the electronic device 102 may determine 410 whether the transaction type 108 is in an institution category of the routing table 106. If the transaction type 108 is included in the institution category of the routing table 106 of the routing table 106, then the electronic device 102 may select 412 the preferred secure element 117 that is associated with that transaction type 108, as indicated by the routing table 106. If the electronic device 102 determines 406 that the transaction type 108 is not in the purchase category of the routing table 106, then the electronic device 102 may select a default secure element 116 for the transaction.

Upon selecting the secure element 116, the electronic device 102 may request 416 confirmation from a user to use the selected secure element 116 for the transaction. For example, the electronic device 102 may display a message on the user interface 120 asking the user to confirm that the transaction should proceed with the selected secure element 116.

The electronic device 102 may determine 418 whether the user confirmed the selected secure element 116. If the user confirms this selection, the electronic device 102 may complete 420 the transaction with the selected secure element 116.

If the electronic device 102 determines 418 that the user does not confirm the selected secure element 116 (for example, if the electronic device 102 receives a command 119 to use another secure element 116 to complete the transaction), then the electronic device 102 may update the routing table 106 to reflect this decision. The electronic device 102 may assign the secure element 116 selected by the user as the preferred secure element 117 for this transaction type 108. The electronic device 102 may complete 420 the transaction using the secure element 116 selected by the user.

Figure 5:
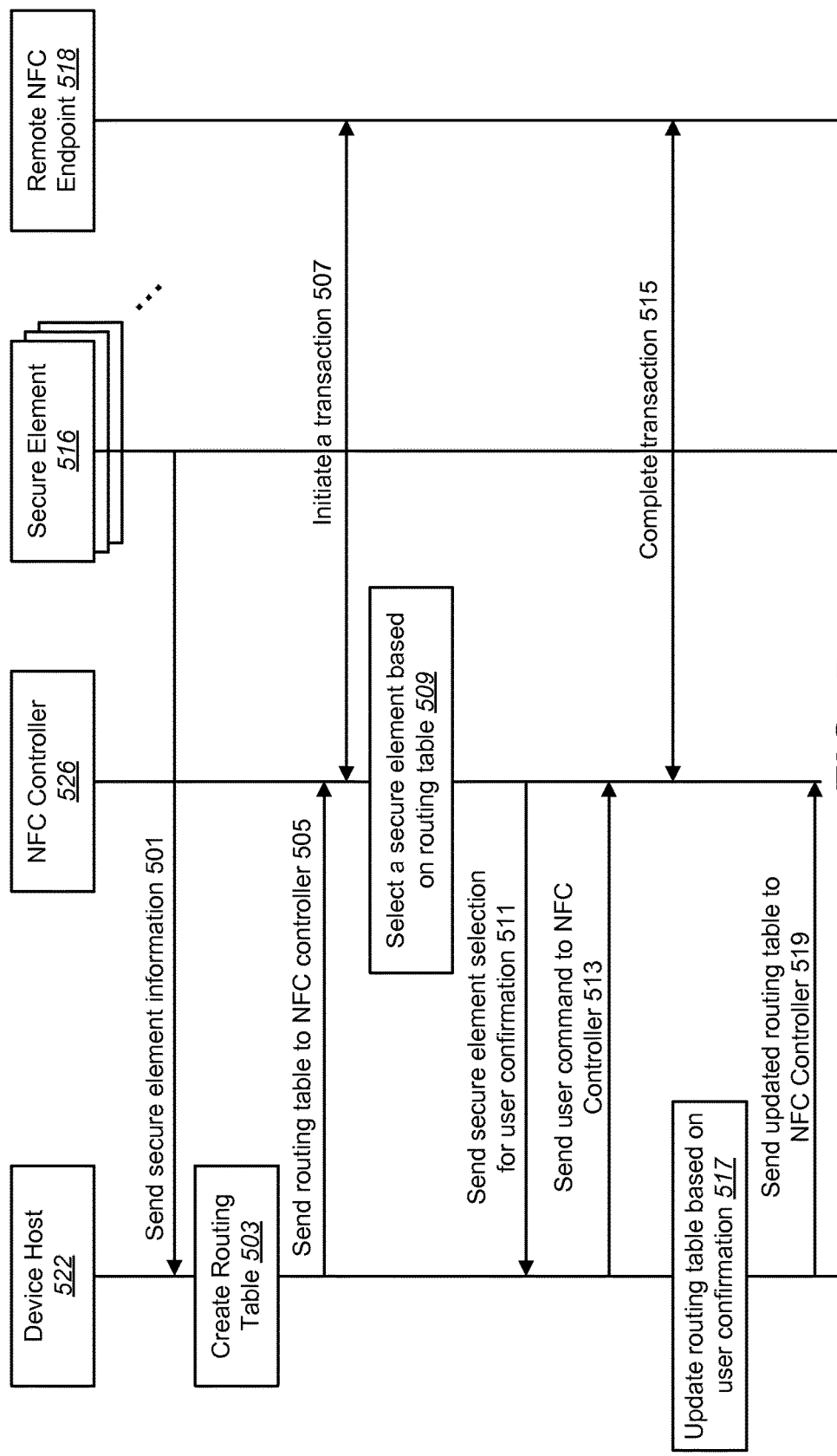
FIG. 5 is a sequence diagram illustrating one configuration of adaptive routing for multiple secure elements.

FIG. 5 is a sequence diagram illustrating one configuration of adaptive routing for multiple secure elements 516. In one configuration, an electronic device 102 may include a device host 522, an NFCC 526 and multiple secure elements 516, as described above in connection with FIG. 1.

The multiple secure elements 516 may send 501 secure element information to the device host 522 (via the NFCC 526). The secure element information may identify one or more methods of payment provided by the multiple secure elements 516. In some configurations, the multiple secure elements 516 may identify an access ticket or a method of payment (e.g., credit card).

The device host 522 may create 503 a routing table 106 as described above in connection with FIG. 1. The routing table 106 may indicate which secure element 516 is a preferred secure element 117 for different transaction types 108. The routing table 106 may be a lookup table that maps transaction types 108 with one or more secure element 116. The routing table 106 may associate a secure element 116 with a particular transaction type 108. The device host 522 may send 505 the routing table 106 to the NFCC 526.

A remote NFC endpoint 518 or the NFCC 526 may initiate 507 a transaction. The NFCC 526 may categorize the transaction into a transaction type 108. Based on the transaction type 108, the NFCC 526 selects 509 a secure element 516 based on the routing table 106.

The NFCC 526 may send 511 the secure element 516 selection for user confirmation to the device host 522. For example, the device host 522 may display the selected secure element 516 on a user interface 120. The user may enter a command 119 to confirm the selected secure element 516 or override the selection. If the user overrides the selection, the user may select another secure element 516 to complete the transaction instead of the selected secure element 516. The device host 522 may send 513 the user command 119 to the NFCC 526.

The remote NFC endpoint 518 or the NFCC 526 may complete 515 the transaction. For example, the NFCC 526 may provide the selected secure element 516 information to the remote NFC endpoint 518 to complete the transaction.

Upon completion of the transaction, the device host 522 may update 517 the routing table 106 based on the user confirmation. If a user command 119 was received to use a different secure element 516, the device host 522 may update the routing table 106 to reflect the change indicated in the user command 119. The device host 522 may send 519 an updated routing table 106 to the NFCC 526.

Figure 6:
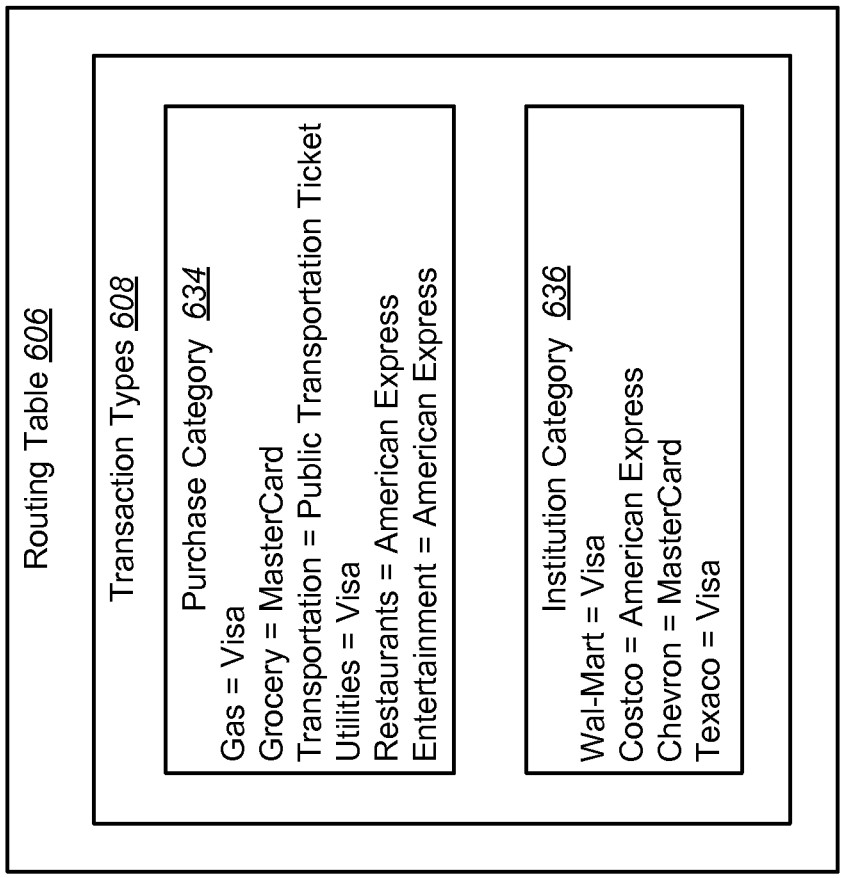
FIG. 6 is an example of a routing table which may be created for adaptive routing for multiple secure elements.

FIG. 6 is an example of a routing table 606 that may be created for adaptive routing for multiple secure elements 116. It should be noted that the values and categories in FIG. 6 are one implementation and could vary.

The routing table 606 includes transaction types 608 that are used to determine a preferred secure element 117 for different transactions. In this routing table 606, the transaction types 608 include a purchase category 634 and an institution category 636. During a learning phase, the user can help categorize a vendor in a purchase category 634 or an institution category 636. Location information (e.g., GPS information) could also be used during this phase to categorize a transaction in the purchase category 634 or an institution category 636.

The purchase category 634 may include goods or items being purchased. For example, with transactions to purchase gas or pay utility bills, the preferred secure element 117 is a Visa secure element 116. In another example, grocery transactions may have a MasterCard secure element 116 as the preferred secure element 117. In yet another example, transportation transactions may have a public transportation ticket secure element 116 as the preferred secure element 117. Restaurant and for entertainment transactions may have an American Express secure element 116 as the preferred secure element 117.

The institution category 636 may include stores or companies at which goods or items are being purchased. For example, with transactions at Wal-Mart or Texaco may have the Visa secure element 116 as the preferred secure element 117. In another example, with transactions at Costco may have the American Express secure element 116 as the preferred secure element 117. In yet another example, with transactions at Chevron, the MasterCard secure element 116 may be the preferred secure element 117.

Figure 7:
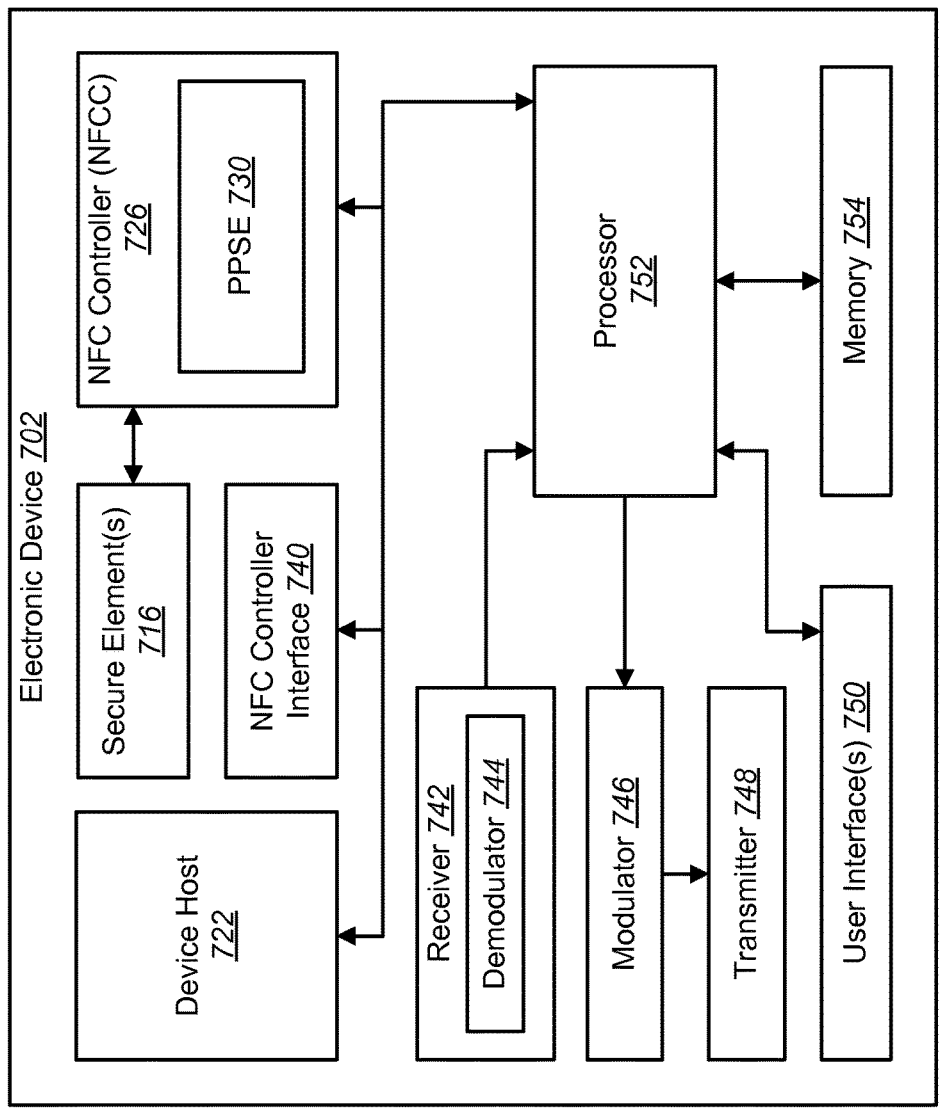
FIG. 7 is a block diagram illustrating another more specific configuration of an electronic device in which systems and methods for adaptive routing for multiple secure elements may be implemented.

FIG. 7 is a block diagram illustrating another more specific configuration of an electronic device 702 in which systems and methods for adaptive routing for multiple secure elements 716 may be implemented. The components included within the electronic device 702 may be examples of corresponding components described above in connection with FIG. 1.

As depicted in FIG. 7, the electronic device 702 includes a receiver 742 that receives a signal from, for instance, a receive antenna (not shown), performs typical actions on (e.g., filters, amplifies, downconverts, etc.) the received signal, and digitizes the conditioned signal to obtain samples. The receiver 742 can comprise a demodulator 744 that can demodulate received symbols and provide them to a processor 752 for channel estimation. The processor 752 can be a processor dedicated to analyzing information received by the receiver 742 and/or generating information for transmission by the transmitter 748, a processor that controls one or more components of the electronic device 702, and/or a processor that analyzes information received by the receiver 742, generates information for transmission by the transmitter 748 and controls one or more components of the electronic device 702. Further, signals may be prepared for transmission by the transmitter 748 through the modulator 746, which may modulate the signals processed by the processor 752.

The electronic device 702 can additionally comprise memory 754 that is operatively coupled to the processor 752 and that can store data to be transmitted, received data, information related to available channels, transmission control protocol (TCP) flows, data associated with analyzed signal and/or interference strength, information related to an assigned channel, power, rate or the like, and any other suitable information for estimating a channel and communicating via the channel.

Further, the processor 752, receiver 742, transmitter 748, NFCC 726, and/or the device host 722 may perform one or more of the functions described above in connection with FIGS. 1-6. It will be appreciated that the data store (e.g., memory 754) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 754 of the subject systems and methods may comprise, without being limited to, these and any other suitable types of memory.

In another aspect, the electronic device 702 may include an NFC controller interface (NCI) 740. In an aspect, the NCI 740 may be operable to enable communications between the device host 722 and the NFCC 726.

The electronic device 702 may include an NFC controller (NFCC) 726. The NFCC 726 may include one or more proximity payment system environment (PPSE) 730. The NFCC 726 may communicate with multiple secure elements 716.

In an aspect, the NFCC 726 may be operable to obtain, through the NCI 740, information from other devices, such as a remote NFC endpoint 318. During ISO-DEP communication, the NFCC 726 may operate using a frame RF interface or an ISO-DEP interface. When operating using the ISO-DEP interface, the NFCC 726 may be operable to change various parameters associated with communications between the device host 722 and the remote NFC endpoint 318 using a data exchange change module.

In some configurations, the NFCC 726 may act as a relay and communicate messages between the device host 722 and a remote NFC endpoint 318. For example, the device host 722 may extract data from messages exchanged with the remote NFC endpoint 318. Communications may prompt the NFCC 726 to change various data. The NFCC 726 may update received parameters and/or may store parameters in memory 754.

Additionally, the electronic device 702 may include one or more user interfaces 750. The user interface(s) 750 may include input mechanism(s) for generating inputs into the electronic device 702 and/or output mechanism(s) for generating information for consumption by the user of the electronic device 702. For example, input mechanism(s) may include a mechanism such as a key or keyboard, a mouse, a touch-screen display, a microphone, etc. Further, for example, output mechanism(s) may include a display, an audio speaker, a haptic feedback mechanism, a Personal Area Network (PAN) transceiver etc. In the illustrated aspects, the output mechanism may include a display operable to present media content that is in image or video format or an audio speaker to present media content that is in an audio format.

Figure 8:
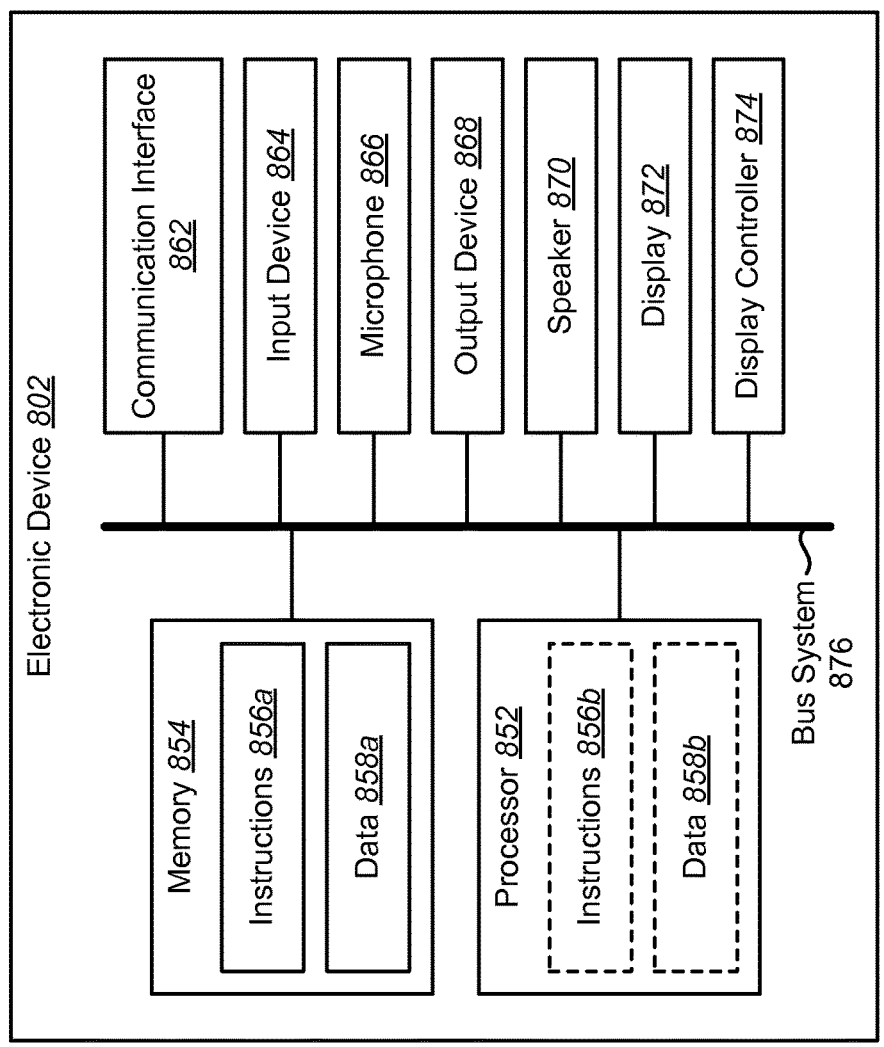
FIG. 8 illustrates various components that may be utilized in an electronic device.

FIG. 8 illustrates various components that may be utilized in an electronic device 802. The illustrated components may be located within the same physical structure or in separate housings or structures. The electronic device 802 described in connection with FIG. 8 may be implemented in accordance with one or more of the electronic devices 102, 702 described herein.

The electronic device 802 includes a processor 852. The processor 852 may be a general purpose single- or multi-chip microprocessor (e.g., an ARM), a special purpose microprocessor (e.g., a digital signal processor (DSP)), a microcontroller, a programmable gate array, etc. The processor 852 may be referred to as a central processing unit (CPU). Although just a single processor 852 is shown in the electronic device 802 of FIG. 8, in an alternative configuration, a combination of processors 852 (e.g., an ARM and DSP) could be used.

The electronic device 802 also includes memory 854 in electronic communication with the processor 852. That is, the processor 852 can read information from and/or write information to the memory 854. The memory 854 may be any electronic component capable of storing electronic information. The memory 854 may be random access memory (RAM), read-only memory (ROM), magnetic disk storage media, optical storage media, flash memory devices in RAM, on-board memory included with the processor 852, programmable read-only memory (PROM), erasable programmable read-only memory (EPROM), electrically erasable PROM (EEPROM), registers, and so forth, including combinations thereof.

Instructions 856a and data 858a may be stored in the memory 854. The instructions 856a may include one or more programs, routines, sub-routines, functions, procedures, etc. The instructions 856a may include a single computer-readable statement or many computer-readable statements. The instructions 856a may be executable by the processor 852 to implement one or more of the methods, functions and procedures described above. Executing the instructions 856a may involve the use of the data 858a that is stored in the memory 854. FIG. 8 shows some instructions 856b and data 858b being loaded into the processor 852 (which may come from instructions 856a and data 858a that are stored in the memory 854).

The electronic device 802 may also include one or more communication interfaces 862 for communicating with other electronic devices. The communication interfaces 862 may be based on wired communication technology, wireless communication technology or both. Examples of different types of communication interfaces 862 include a serial port, a parallel port, a Universal Serial Bus (USB), an Ethernet adapter, an Institute of Electrical and Electronics Engineers (IEEE) 1394 bus interface, a near-field communication (NFC) transceiver, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 862 may be coupled to one or more antennas (not shown) for transmitting and receiving wireless signals.

The electronic device 802 may also include one or more input devices 864 and one or more output devices 868. Examples of different kinds of input devices 864 include a keyboard, mouse, microphone 866, remote control device, button, joystick, trackball, touchpad, lightpen, etc. For instance, the electronic device 802 may include one or more microphones 866 for capturing acoustic signals. In one configuration, a microphone 866 may be a transducer that converts acoustic signals (e.g., voice, speech) into electrical or electronic signals. Examples of different kinds of output devices 868 include a speaker 870, printer, etc. For instance, the electronic device 802 may include one or more speakers 870. In one configuration, a speaker 870 may be a transducer that converts electrical or electronic signals into acoustic signals. One specific type of output device 868 that may be typically included in an electronic device 802 is a display 872 device. Display 872 devices used with configurations disclosed herein may utilize any suitable image projection technology, such as a cathode ray tube (CRT), liquid crystal display (LCD), light-emitting diode (LED), gas plasma, electroluminescence, or the like. A display controller 874 may also be provided, for converting data stored in the memory 854 into text, graphics, and/or moving images (as appropriate) shown on the display 872 device.

The various components of the electronic device 802 may be coupled together by one or more buses, which may include a power bus, a control signal bus, a status signal bus, a data bus, etc. For simplicity, the various buses are illustrated in FIG. 8 as a bus system 876. It should be noted that FIG. 8 illustrates only one possible configuration of an electronic device 802. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication on an electronic device, comprising:
    initiating a transaction with a remote near-field communication (NFC) endpoint;
    selecting a first secure element for the transaction from among multiple secure elements based on a routing table, wherein the routing table assigns a preferred secure element for a transaction type;
    completing the transaction without user confirmation using the first secure element when the electronic device is in a low-power mode and a device host is unavailable;
    notifying a user that the transaction was completed using the first secure element when the device host is available;
    receiving a command to use a second secure element as a preferred secure element for a transaction type of the transaction instead of the first secure element; and
    assigning the second secure element as the preferred secure element for the transaction type of the transaction in the routing table based on the received command.

2. The method of claim 1, wherein selecting the first secure element for the transaction comprises:
    determining the transaction type of the transaction; and using the routing table to determine that the first secure element is the preferred secure element for the transaction type.

3. The method of claim 1, further comprising dynamically selecting the second secure element for a subsequent transaction with a same transaction type.

4. The method of claim 1, further comprising creating the routing table based on user preferences for transaction types provided at initiation of the multiple secure elements.

5. The method of claim 1, wherein transaction types of the routing table are organized in one or more categories.

6. The method of claim 5, wherein the one or more categories comprise at least one of a purchase category and an institution category.

7. The method of claim 1, wherein the routing table is sent to an NFC controller.

8. The method of claim 7, wherein a payment system of the NFC controller uses the routing table to determine which secure element to select for a transaction.

9. An electronic device for wireless communication, comprising:
   a processor;
   memory in electronic communication with the processor; and
   instructions stored in the memory, the instructions being executable by the processor to:
   initiate a transaction with a remote near-field communication (NFC) endpoint;
   select a first secure element for the transaction from among multiple secure elements based on a routing table, wherein the routing table assigns a preferred secure element for a transaction type;
   complete the transaction without user confirmation using the first secure element when the electronic device is in a low-power mode and a device host is unavailable;
   notify a user that the transaction was completed using the first secure element when the device host is available;
   receive a command to use a second secure element as a preferred secure element for a transaction type of the transaction instead of the first secure element; and
   assign the second secure element as the preferred secure element for the transaction type of the transaction in the routing table based on the received command.

10. The electronic device of claim 9, wherein the instructions executable to select the first secure element for the transaction comprise instructions executable to:
    determine the transaction type of the transaction; and
    use the routing table to determine that the first secure element is the preferred secure element for the transaction type.

11. The electronic device of claim 9, further comprising instructions executable to dynamically select the second secure element for a subsequent transaction with a same transaction type.

12. The electronic device of claim 9, further comprising instructions executable to create the routing table based on user preferences for transaction types provided at initiation of the multiple secure elements.

13. The electronic device of claim 9, wherein transaction types of the routing table are organized in one or more categories.

14. The electronic device of claim 9, wherein the routing table is sent to an NFC controller.

15. A computer-program product for wireless communication, comprising a non-transitory tangible computer-readable medium having instructions thereon, the instructions comprising:
    code for causing the electronic device to initiate a transaction with a remote near-field communication (NFC) endpoint;
    code for causing the electronic device to select a first secure element for the transaction from among multiple secure elements based on a routing table, wherein the routing table assigns a preferred secure element for a transaction type;
    code for causing the electronic device to complete the transaction without user confirmation using the first secure element when the electronic device is in a low-power mode and a device host is unavailable;
    code for causing the electronic device to notify a user that the transaction was completed using the first secure element when the device host is available;
    code for causing the electronic device to receive a command to use a second secure element as a preferred secure element for a transaction type of the transaction instead of the first secure element; and
    code for causing the electronic device to assign the second secure element as the preferred secure element for the transaction type of the transaction in the routing table based on the received command.

16. The computer-program product of claim 15, wherein the code for causing the electronic device to select the first secure element for the transaction comprises:
    code for causing the electronic device to determine the transaction type of the transaction; and
    code for causing the electronic device to use the routing table to determine that the first secure element is the preferred secure element for the transaction type.

17. The computer-program product of claim 15, further comprising code for causing the electronic device to dynamically select the second secure element for a subsequent transaction with a same transaction type.

18. The computer-program product of claim 15, further comprising code for causing the electronic device to create the routing table based on user preferences for transaction types provided at initiation of the multiple secure elements.

19. The computer-program product of claim 15, wherein transaction types of the routing table are organized in one or more categories.

20. The computer-program product of claim 15, wherein the routing table is sent to an NFC controller.

21. An apparatus for wireless communication, comprising:
    means for initiating a transaction with a remote near-field communication (NFC) endpoint;
    means for selecting a first secure element for the transaction from among multiple secure elements based on a routing table, wherein the routing table assigns a preferred secure element for a transaction type;
    means for completing the transaction without user confirmation using the first secure element when the electronic device is in a low-power mode and a device host is unavailable;
    means for notifying a user that the transaction was completed using the first secure element when the device host is available;
    means for receiving a command to use a second secure element as a preferred secure element for a transaction type of the transaction instead of the first secure element; and
    means for assigning the second secure element as the preferred secure element for the transaction type of the transaction in the routing table based on the received command.

22. The apparatus of claim 21, wherein the means for selecting the first secure element for the transaction comprise:
- means for determining the transaction type of the transaction; and
- means for using the routing table to determine that the first secure element is the preferred secure element for the transaction type.

23. The apparatus of claim 21, further comprising means for dynamically selecting the second secure element for a subsequent transaction with a same transaction type.

24. The apparatus of claim 21, further comprising means for creating the routing table based on user preferences for transaction types provided at initiation of the multiple secure elements.

25. The apparatus of claim 21, wherein transaction types of the routing table are organized in one or more categories.

26. The apparatus of claim 21, wherein the routing table is sent to an NFC controller.

\* \* \* \* \*